E. A. DE WATERS.
CONTROL FOR CHANGE SPEED GEARING.
APPLICATION FILED APR. 4, 1913.
1,116,575.
Patented Nov. 10, 1914.
3 SHEETS—SHEET 3.
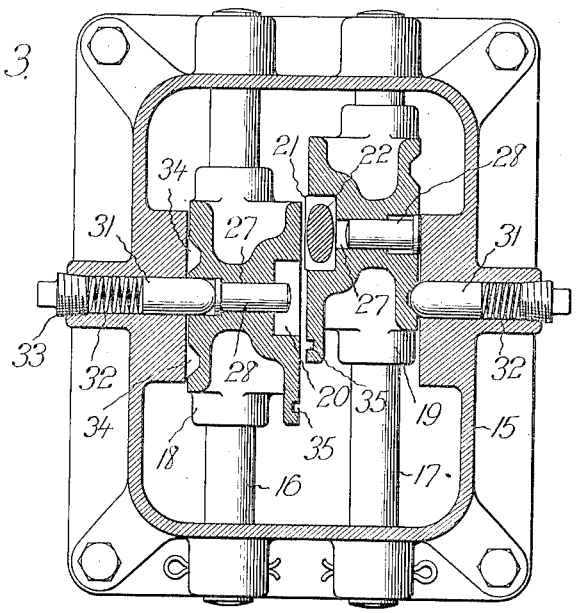
Fig. 3.
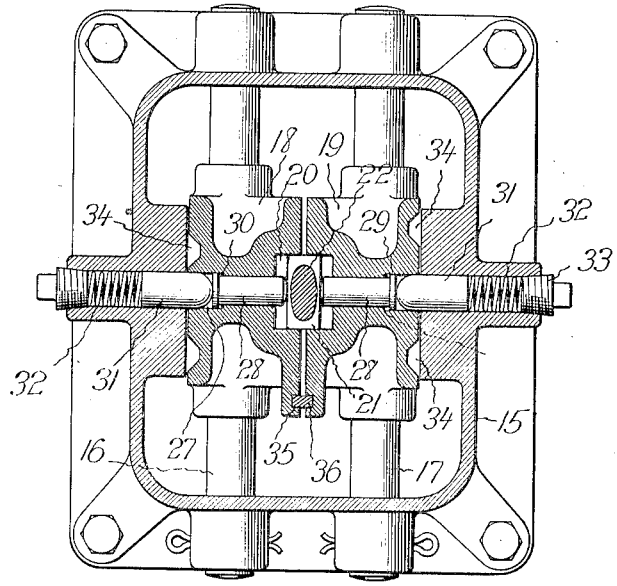
Fig. 4.
Witnesses:
Chas. W. Stauffiger
Anna M. Dorr.
Inventor
Enos A. De Waters
By  Atty.

UNITED STATES PATENT OFFICE.

ENOS A. DE WATERS, OF FLINT, MICHIGAN, ASSIGNOR TO BUICK MOTOR COMPANY, OF FLINT, MICHIGAN, A CORPORATION OF MICHIGAN.

CONTROL FOR CHANGE-SPEED GEARING.

1,116,575.  Specification of Letters Patent.  Patented Nov. 10, 1914.

Application filed April 4, 1913. Serial No. 758,766.

*To all whom it may concern:*

Be it known that I, ENOS A. DE WATERS, a citizen of the United States of America, residing at Flint, in the county of Genesee and State of Michigan, have invented certain new and useful Improvements in Control for Change-Speed Gearing, of which the following is a specification, reference being had therein to the accompanying drawings.

This invention relates to an improved lever control for shifting and locking the gears of power transmitting mechanisms of the sliding gear type and its object is to facilitate operation, give a simple and compact construction and guard against the accidental or inadvertent shifting of the gears.

To these ends the invention consists in the matters hereinafter set forth and more particularly pointed out in the claims reference being had to the accompanying drawings in which—

Figure 1:
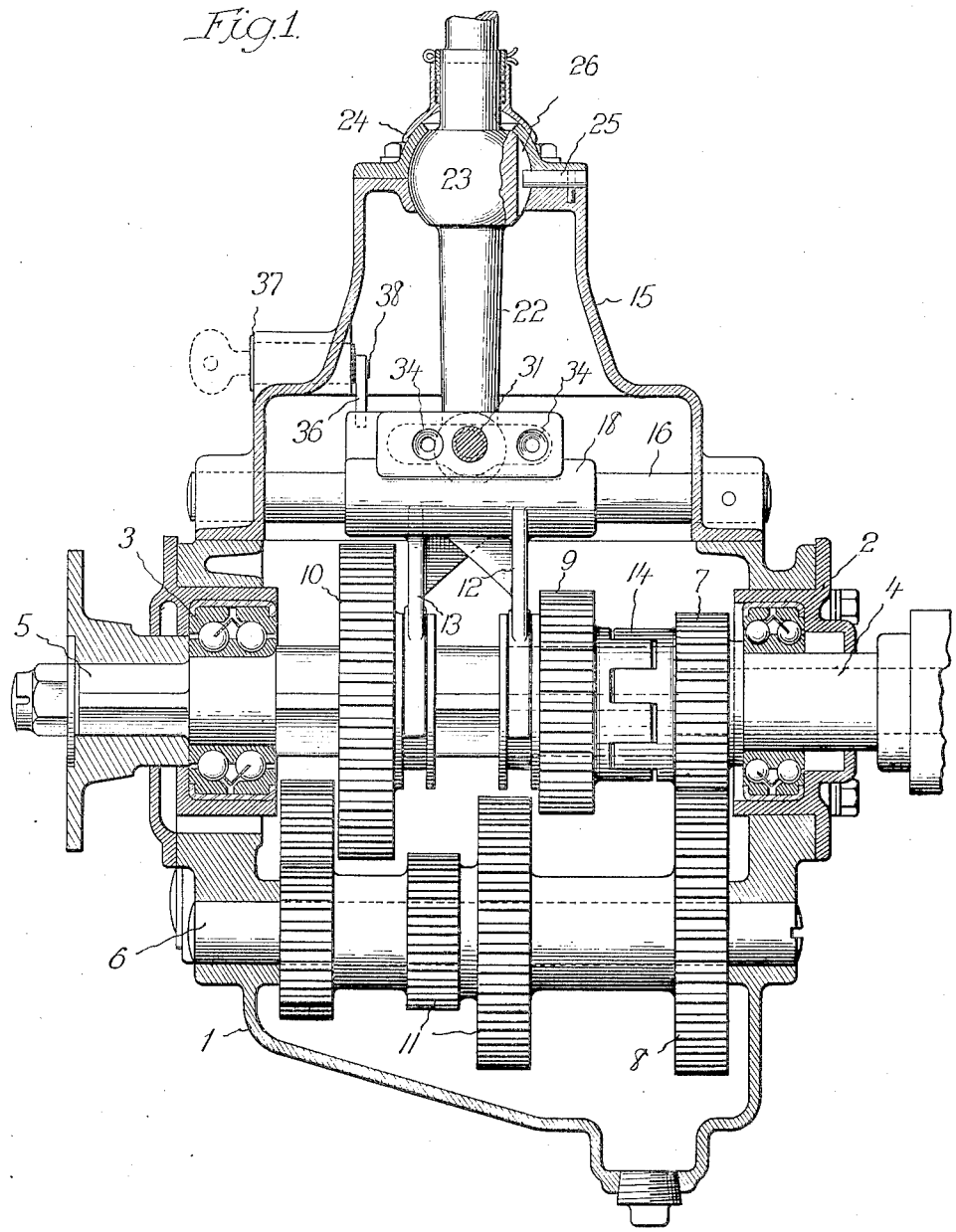
Figure 2:
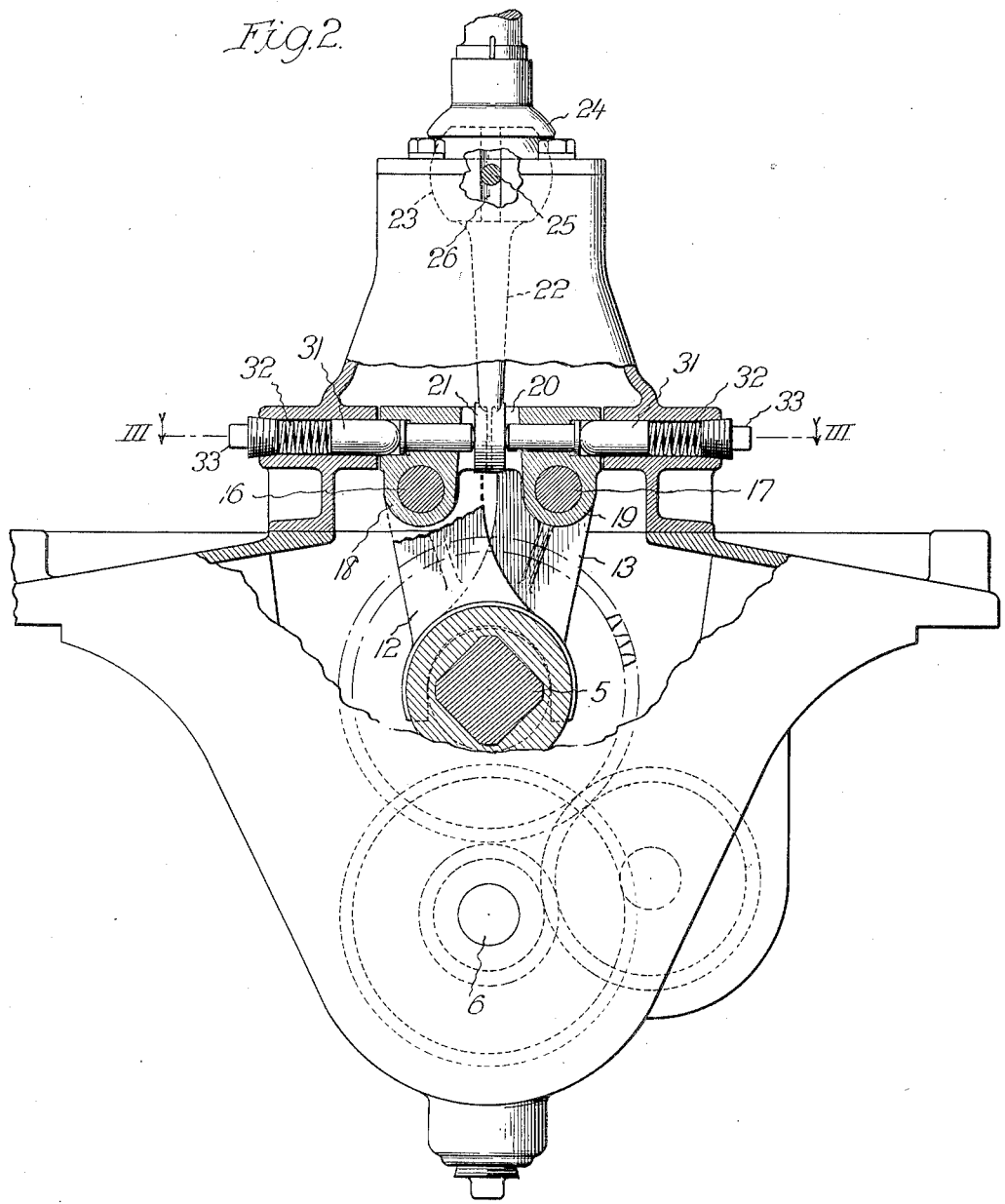

Figure 1 is a longitudinal vertical section through a device embodying the invention; Fig. 2 is an end elevation of the same with parts broken away and in section to show the construction; Fig. 3 is a horizontal section on the line III—III of Fig. 2; and Fig. 4 is a similar view showing the shifting members in neutral and locked position.

For convenience of illustration the invention is shown as applied to a power transmitting mechanism of a particular construction but it will be understood that this invention may be applied as well to any other form of transmission mechanism of the sliding gear type in which a change of speed or direction of motion is obtained by shifting certain gears longitudinally to bring them and certain clutch mechanism into operative position.

The sliding gear transmission mechanism shown comprises a suitable casing 1 having suitable bearings 2 and 3 in its ends for a driving shaft 4 and a driven shaft 5. The casing is also provided with bearings for a countershaft 6 and secured upon the driving shaft is a gear 7 in mesh with a gear 8 on the counter shaft to transmit motion thereto. Gears 9 and 10 are mounted upon the driven shaft to slide freely longitudinally thereof and are operatively connected thereto to turn therewith and a plurality of gears 11 is provided upon the counter shaft to mesh with said gears 9 and 10 when the same are shifted into engagement therewith by means of forked arms 12 and 13 which engage suitable grooved hubs on the gears 9 and 10 respectively. A suitable clutch member is carried by the gear 9 to engage a clutch member on the gear 7 and thus form a clutch 14 to directly connect the driving and driven shafts. This construction of sliding gear change speed mechanism is old and well known and it will be understood that it forms no part of this invention, which invention resides in the mechanism for actuating the arms 12 and 13 and shifting the gears to give the desired change of speed or direction of motion.

Mounted in suitable bearings provided in a suitable cap or dome 15 which closes the upper side of the casing 1, are two fixed parallel shafts 16 and 17 and the forked arms 12 and 13 are provided with tubular heads 18 and 19 respectively through which these shafts extend and upon which they are free to slide longitudinally. These heads or shifting members are formed with adjacent flat sides which are notched or cut away as at 20 to receive a head 21 upon the lower end of shifting lever 22 which extends upward through the upper end of the cap 15 and is provided intermediate its ends with a ball 23 to engage a suitable seat or socket 24 provided therefor in the upper end of the cap. The globular enlargement 23 of the lever, engaging the seat in the cap and held therein, permits said lever to be rocked longitudinally or transversely of the casing, and to prevent said lever from turning upon its longitudinal axis within its seat, a pin 25 in the cap engages a vertical slot 26 in one side of the ball 23.

Each notch 20 in each head is of such a depth that the head 21 on the end of the shifting lever, may, by a lateral movement of said lever be moved into one of these notches and the shifting member moved longitudinally upon its shaft to shift one of the gears when the shifting lever is rocked longitudinally of the casing. When these shifting members are directly opposite each other upon their shafts, the shifting lever may be engaged with either one of them as desired, as shown in Fig. 1. When said members are in this position, the gears 9 and 10 are in neutral or inoperative position and no motion is transmitted to the driven shaft from the driving shaft by either of them.

To hold the shifting members 18 and 19 in neutral position and locked against movement longitudinally upon their shafts, each member is bored transversely with the inner ends of the bores opening into the notches 20 at the center thereof, and in each of these bores 27 is placed a loose pin 28 having a rounded inner end to engage the side of the head 21 of the shifting lever and provided at its outer end with a flange 29 sliding within a slight enlargement of the outer end of each bore. This enlargement of the bore provides a shoulder 30 adapted to be engaged by the flange 29 to limit the inward movement of the pin so that when one of the shifting members is moved out of alinement with the other, the pin of said other member will be prevented from sliding inward into the path of the head 21 on the shifting lever. Mounted in suitable bearings in the sides of the cap 15, are plungers 31 having rounded inner ends adapted to project into the outer ends of the bores 27 when the shifting members are in neutral position, and each of these plungers is yieldingly forced inward by means of a spring 32 in the bearing held therein by means of a screw plug 33. These springs normally hold the plungers forced inward with their rounded inner ends against the outer ends of the pins 28 and thus said pins are forced inward with their ends against the sides of the head of the shifting lever. The action of these spring plungers thus holds the shifting lever with its head 21 projecting partly in each notch 20. This locks the shifting members together and the engagement of the plungers with the outer ends of the bores 27 securely locks each shifting member and its forked arm in neutral position. Either of the shifting members may be unlocked by a lateral rocking movement of the shifting lever 22, such movement shifting the head 21 on said lever laterally into one of the notches against the action of the spring plunger which will thus be moved outwardly by its pin 28 which is moved by its engagement with said head.

When one of the shifting members is moved longitudinally on its shaft to shift one of the gears, it is yieldingly held in the position to which it is shifted with the gear properly engaged, by means of the engagement of its plunger 31 with notches 34 properly located in the sides of the shifting members. The shifting members are thus yieldingly held in the position to which they are shifted against accidental displacement and when either member is in neutral position it is positively locked by its plunger 31 against accidental movement. In this construction one of the shifting members cannot be moved while the other is out of neutral position and it is therefore necessary to always bring the members into alinement in neutral position before a change of speed can be made. Accidents due to mistakes are therefore obviated as there is no possibility of bringing two of the gears into operative position at the same time. This particular arrangement of shifting members provides for the simple and convenient application thereto of a key lock for locking the parts against movement and thus preventing the unauthorized use of the motor vehicle or other device to which this gearing may be applied. For so locking the parts, the shifting members 18 and 19 are provided with notches 35 in their adjacent faces which notches are adapted to be engaged when said members are in neutral position, by a bolt 36 mounted in a suitable bearing in the cap 15 adjacent to one end of said members when they are in neutral position. This bolt 36 is adapted to be moved vertically by any suitable key operated lock, preferably a lock 37 of the Yale type being provided with the usual rotatable barrel to which is secured an arm 38 for engaging and moving the bolt 36, all arranged in any suitable manner. The bolt 36 engaging a notch in each shifting member positively locks these members together and against movement, and thus it is absolutely impossible to operate the gearing and run the motor vehicle without first unlocking the key lock so that the lever 22 may be operated to shift the gears.

Obviously, changes may be made in the construction and arrangement of parts without departing from the spirit of my invention and I do not wish to limit myself to the particular form and arrangement shown.

Having thus fully described my invention what I claim is:—

1. The combination with a change speed mechanism having sliding gears, of means for shifting said gears comprising longitudinally movable shifting members located above said gears, a shifting lever adapted to be brought into operative relation with either of said members by a lateral movement of said lever, and locking means for each member moved out of locking position by said lateral movement of said lever, said means being automatic to lock said members independent of said lever.

2. The combination with a change-speed mechanism having sliding gears, of means for shifting said gears comprising longitudinally movable shifting members, a shifting lever adapted to be brought into operative relation with either of said members, and separate locking means disposed at an angle thereto and including an automatically actuated plunger for each member to positively lock the same against movement and adapted to be operated by said lever to unlock said members when said lever is moved into operative relation with said members.

3. The combination with a change speed mechanism having sliding gears, of means for shifting said gears comprising a shifting lever, shifting members movable longitudinally along parallel lines and adapted to shift and hold said sliding gears in inoperative position when said members are shifted to a position opposite each other, and spring actuated locking members to engage the shifting members when opposite each other, said lever being adapted to be moved into operative relation with either of said shifting members when the same are opposite each other and to engage one of the locking members when so moved and unlock said shifting member.

4. The combination with a change speed mechanism having sliding gears, of means for shifting said gears comprising shifting members movable longitudinally along parallel lines and having recesses in their adjacent sides, a shifting lever adapted to be moved laterally into engagement with a recess in either of said members and when so engaged with one of said members adapted to be moved to shift said member longitudinally, said lever being locked in the recess of a member by the adjacent member until the shifted gear is restored to its normal position, and means supported independently of said members for locking each of said members adapted to be moved out of locking engagement by the lateral movement of said lever to engage the same with one of said members.

5. The combination with a change speed mechanism having sliding gears, of means for shifting said gears comprising shifting members movable longitudinally along parallel lines and having recesses in their adjacent sides, said members being adapted to hold said gears in inoperative position when said members are opposite each other, a shifting lever adapted to be engaged with either of said members by a lateral movement of said lever when the members are shifted to bring their recesses in opposed relation, and locking means supported independent of said members and including automatic shiftable plungers for simultaneously locking both of said members to hold the same with said gears in inoperative position, said lever being adapted to unlock one of said members by the movement of said lever into the recess of said member.

6. The combination with a change speed mechanism having sliding gears, of a pair of shifting members movable longitudinally along parallel lines and each member formed with a transverse bore, spring actuated locking members to engage the outer ends of said bores and lock said members against movement and a shifting lever adapted to be shifted laterally into operative relation with either member and to move the locking member of said member to unlock the same.

7. The combination with a change speed mechanism having sliding gears, of a pair of shifting members movable longitudinally along parallel lines and formed with notches in their outer sides, said members being also formed with transverse bores, spring actuated locking plungers having rounded ends to engage said notches and frictionally hold said members against movement and also to engage said bores and lock said members against movement, and a shifting lever adapted to be moved laterally into engagement with either of said members and to move said locking plungers out of locking engagement with said bores by such lateral movement.

8. The combination with a change speed mechanism having sliding gears, of a shifting lever adapted to be moved both laterally and longitudinally of the shifting movement of said gears, a pair of shifting members movable longitudinally along parallel lines and having transverse bores, locking plungers to engage the outer ends of said bores, and slidable members in the bores having their outer ends in engagement with said plungers and their inner ends in the path of lateral movement of said lever.

9. The combination with a change speed mechanism having sliding gears, of shifting members for shifting said gears, movable longitudinally side by side, a shifting lever to shift said members longitudinally, and a key operated locking member to simultaneously engage said members and lock the same against movement.

10. The combination with a change speed mechanism having sliding gears, of shifting members movable along parallel lines with their sides adjacent to each other and notches in said sides, a shifting lever for shifting said members, and a key operated locking bolt to simultaneously engage the notches in said members and lock both against movement.

11. The combination with a change speed mechanism having sliding gears, and means for moving certain gears comprising a longitudinally movable shifting member for moving a gear, a shifting lever for moving said member, and a key operated locking member to engage said member and lock the same against movement.

12. The combination with a change speed mechanism having sliding gears, of a casing having bearings in the sides thereof, plungers in said bearings, parallel shafts in said casing, shifting members movable longitudinally upon said shafts and formed with transverse bores adapted to be engaged by said plungers, said members being formed with recesses in their adjacent sides, a shifting lever adapted to be moved laterally into engagement with the recess in either of said members, and pins in said bores movable longitudinally of said bores and adapted to project into said recesses into the path of lateral movement of said lever.

13. The combination with a change speed mechanism having sliding gears, of means for shifting said gears comprising movable shifting members, a shifting lever adapted to be brought into operative relation with either of said members, and spring actuated locking means adapted to engage the outer sides of said members to prevent said members from accidentally shifting, said means being operatable by said lever to release said members whereby said members can be shifted by said lever.

14. The combination with a change speed mechanism having sliding gears, of means for shifting said gears comprising movable shifting members, a shifting lever adapted to be brought into operative relation with either of said members, and spring actuated locking means adapted to engage the outer sides of said members to prevent said members from accidentally shifting, said means being operatable by said lever to release said members whereby said members can be shifted by said lever, and key-actuated locking means interposed between said members and independent of the first mentioned locking means for holding said members against movement.

15. A shifting device for change speed mechanisms having sliding gears, comprising members movable longitudinally along parallel lines, a lever interposed between said members and adapted to be moved to independently shift said members, said lever being locked in the shifted member by the adjacent member, and means engaging the outer sides of said members for independently locking said members in an adjusted position.

16. A shifting device for change speed mechanisms having sliding gears, comprising members movable longitudinally along parallel lines, a lever interposed between said members and adapted to be moved to independently shift said members, means engaging the outer sides of said members for independently locking said members in an adjusted position, and means adapted to be interposed between said members to lock both of said members against movement.

In testimony whereof I affix my signature in presence of two witnesses.

ENOS A. DE WATERS.

Witnesses:
W. L. NELSON,
WALTER L. MARR.